United States Patent [19]

Webber et al.

[11] Patent Number: 5,222,176
[45] Date of Patent: Jun. 22, 1993

[54] OPTICAL FIBER CABLE JOINTS AND TERMINATIONS

[75] Inventors: Graham Webber; Stuart E. Wright, both of Hants, England

[73] Assignee: Northern Telecom Limited, Montreal, Canada

[21] Appl. No.: 889,153

[22] Filed: May 27, 1992

[30] Foreign Application Priority Data

Jun. 1, 1991 [GB] United Kingdom ............... 9111823

[51] Int. Cl.$^5$ .................................................. G02B 6/44
[52] U.S. Cl. ........................................ 385/99; 385/100; 385/76; 385/77; 385/86; 385/95
[58] Field of Search ................ 385/69, 70, 86, 100, 385/107, 95, 99, 76, 77, 84, 87, 51, 55; 174/70 R, 72 C, 70 S

[56] References Cited

U.S. PATENT DOCUMENTS

| | | | |
|---|---|---|---|
| 4,601,536 | 7/1986 | Guazzo | 385/69 |
| 4,699,459 | 10/1987 | Priaroggia | 385/69 |
| 4,717,232 | 1/1988 | Priaroggia | 385/69 |
| 4,722,590 | 2/1988 | Thomas | 385/107 |
| 4,773,724 | 9/1988 | Bjoralie | 385/99 X |
| 4,784,459 | 11/1988 | Jenkins | 385/99 |
| 4,834,489 | 5/1989 | Betzler et al. | 385/69 X |
| 5,009,474 | 4/1991 | Wurmser et al. | 385/99 X |
| 5,022,735 | 6/1991 | Dahlgren | 385/99 X |
| 5,046,814 | 9/1991 | Crespo-Ruiz et al. | 385/113 |
| 5,066,095 | 11/1991 | Dekeyser et al. | 385/135 |
| 5,081,695 | 1/1992 | Gould | 385/99 X |
| 5,134,470 | 7/1992 | Ravetti | 385/99 X |

FOREIGN PATENT DOCUMENTS

| | | | |
|---|---|---|---|
| 0067673 | 12/1982 | European Pat. Off. | 385/69 X |
| 2065915 | 7/1981 | United Kingdom | 385/69 X |
| 2224757 | 5/1990 | United Kingdom | 385/69 X |
| 2229545 | 9/1990 | United Kingdom | 385/69 X |

Primary Examiner—Brian Healy
Attorney, Agent, or Firm—Lee, Mann, Smith, McWilliams, Sweeney & Ohlson

[57] ABSTRACT

A cable joint or termination has a plastics insulating layer formed by a pair of pre-formed polyethelene parts 7 and 8 which are a close fit around the casing 3 and the cable insulations 1C, 2C. The parts are bonded by ring moulds 9, 10 and 11. This is quicker and cheaper than previous techniques of injection moulding to a sleeve and the cable at the end regions of the casing, and prevents occlusion caused by cable outgassing.

3 Claims, 1 Drawing Sheet

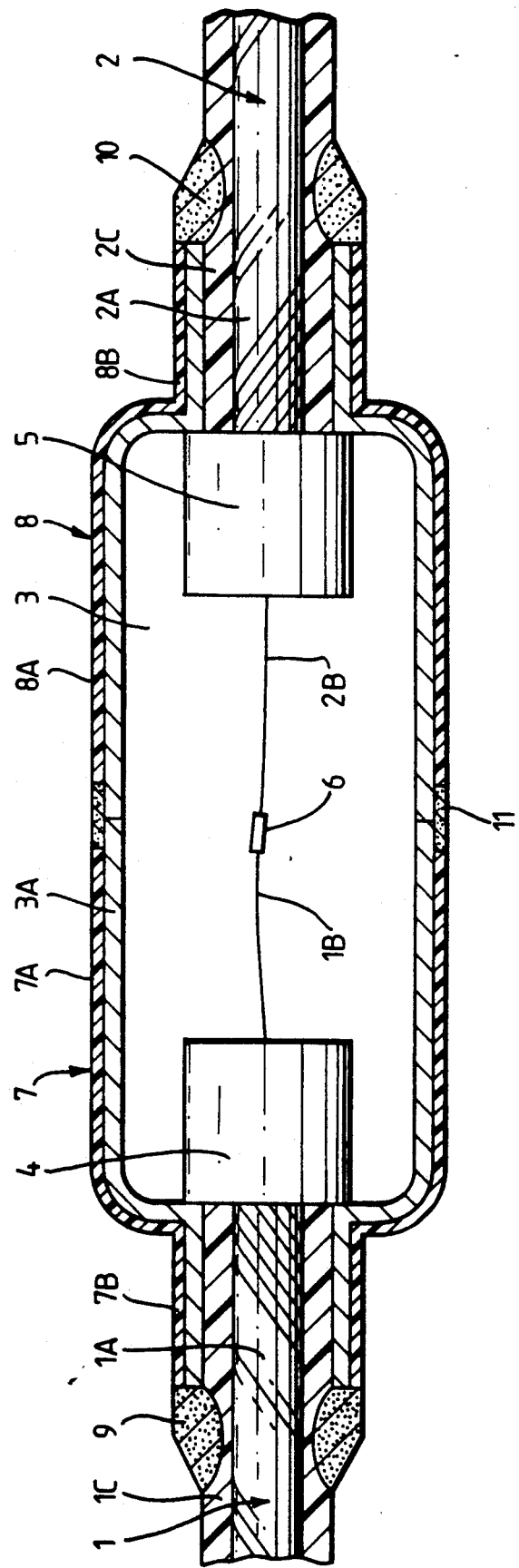

OPTICAL FIBER CABLE JOINTS AND TERMINATIONS

This invention relates to cable joints and terminations particularly joints for underwater use.

BACKGROUND OF THE INVENTION

The existing practice for underwater cable joints and terminations is to provide an electrically insulating layer over a cable joint which provides electrical insulation continuity from the insulation of one cable to the insulation of the other cable to be joined to it. This is done by moulding using an injection moulding technique. Conventionally polyethylene moulding is used, comprising a polyethylene moulding sleeve which is positioned centrally over the joint. The cable core i.e. the cable insulation, and the polyethylene sleeve ends are then heated in a moulding unit ready for molten polyethylene to be injected, which then amalgamates the sleeve and the core ends together.

The insulating layer can also provide the main or only barrier against water penetration into the joint or termination.

This existing technique is time consuming and we have found that the heat produced by the moulding process can have a deleterious effect not only on the joint but also on the cable, particularly where an adhesive, such as an EVA adhesive is used to bond component parts of the cable to prevent relative movement between those parts, or to act as a water blocking material.

It is an object of the present invention to overcome these disadvantages.

SUMMARY OF THE INVENTION

According to the present invention an underwater cable joint or termination comprising a pressure-resistant tubular metal casing provided with a plastics electrically-insulating layer, said plastics layer consisting of a pre-formed part which comprises a tubular housing portion which has been fitted on to the metal casing and a tubular end portion of smaller diameter than the housing portion which has been fitted on to a tubular insulation layer of the cable, said end portion being bonded to the cable insulation by a hot moulding process in such manner as to prevent hot moulding material contacting component parts of the cable other than the cable insulation, said preformed part being supported against external hydraulic pressure by the casing and the cable over substantially all its internal surface area.

Conveniently, where a cable joint is concerned, a second pre-formed part similar to the first one can be fitted to the other side of the joint and bonded to the second cable insulation by a hot moulding process in such manner as to prevent hot moulding material contacting component parts of the cable other than the cable insulation, and bonded also to the first pre-formed part.

Preferably a tubular end portion is a sliding fit over the cable insulation and is bonded thereto by a ring-shaped moulded region which penetrates the cable insulation by an amount less than the thickness of the cable insulation.

Preferably also, where two pre-formed parts are fitted to opposite ends of a joint, they are joined together by a ring-shaped moulded region.

BRIEF DESCRIPTION OF THE DRAWINGS

In order that the invention can be clearly understood reference will now be made to the accompanying drawing which shows schematically and partially in cross section a submarine cable joint having a plastics electrically-insulating layer according to an embodiment of the present invention.

DESCRIPTION OF PREFERRED EMBODIMENTS

Referring to the drawing there is shown a deep sea underwater telecommunications cable 1 joined to a similar deep sea telecommunications cable 2 by means of a joint 3. The joint 3 comprises a steel sea case 3A to which the strength member wires 1A and 2A of the respective cables, are clamped in opposite ends of the sea case 3A. These clamps are represented schematically by blocks 4 and 5 respectively, but each may be like the one described in our co-pending British Application No. 2224757A. The joint internally and the casing could be similar to that disclosed in our co-pending application 2229545A.

Within the casing the optical fibres of the two cables will be spliced as represented at 6, the optical fibres of the respective cables being represented by reference numeral 1B and 2B.

There will also be an electrical continuity in the joint and may be represented by the sea case itself or by an electrical conductor within the sea case extending between the conductive portions of the two cables. Normally the central strength member wires 1 and 2 will themselves provide electrical conductivity, together with a tubular electrical conductor within the wires or a tubular electrical conductor closely surrounding and in intimate contact with the wires, neither of which is shown in the drawings but a typical example of which is shown in our British Patent 1550588, and this cable shows both an electrical conductor within the strength member wires and surrounding and in intimate contact with the strength member wires.

Each submarine cable 1 and 2 has an electrically insulating layer 1C and 2C of polyethelyne. Prior to completing an electrically insulating layer over the joint housing, the insulating layers are shaved to bring them to an accurate outer diameter.

A pair of plastics pre-manufactured i.e. pre-formed housing parts 7 and 8 of polyethelene are slid towards each other to cover the sea case and provide electrical insulating integrity and watertightness between the layer 2C and the layer 1C.

Each housing part 7 and 8 has a larger diameter housing portion 7A and 8A which encircles the sea case and a tubular end portion 7B and 8B. Portions 7B and 8B are a sliding fit on the shaved cable insulation and when the parts are in position around the sea case, the end portions 7B and 8B are bonded to the respective cable insulation 1C and 2C by respective ring moulds represented schematically by 9 and 10 where the polyethylene is molten to a depth in the insulation which is less than the thickness of the insulation so the molten moulding material does not come into contact with the underlying component parts of the cable.

Similarly a ring mould is made to amalgamate the facing ends of the housing portions 7A and 8A and this is represented by reference numeral 11.

It is emphasised that the pre-formed parts 7 and 8 fit accurately around the sea casing and the cable insulation so that when subjected to the pressures existing on the sea bed, there is no distortion of the pre-moulded parts because the sea casing and the cable insulation support the parts against such pressure substantially over the whole internal surface area of the two parts.

Because the moulding technique used to bond the parts 7 and 8 to the cable insulation does not heat up the cable parts nor the joint to any appreciable extent, then any parts of the cables or the joint which are susceptible to heat are thus protected, and in particular where an EVA adhesive is used to bond the cable insulation 1C and 2C to the respective strength member wires 1A and 2A, this adhesive is not affected by the ring moulding technique.

We have found that whereas previous techniques cause moulding material to impregnate component parts of the cable causing out gassing and inclusions of gas in the moulding, thereby sometimes producing defective insulating parts, with the arrangement described above, no outgassing occurs and good insulation properties are maintained throughout the joint from one cable insulation to the other. Furthermore the process has proved to be much quicker than previous techniques.

Although a cable joint is shown a similar technique would be applicable to a cable termination.

The ring mould 11, being located at the centre of the sea case 3, reduces the chance of the housing portions flexing and disturbing the moulding during the ring moulding operation because the sea casing accurately locates the housing parts.

The tubular end portions 7B and 8B are coextensive with the cable insulation 1C and 2C over an axial length of about three inches, more than three times the diameter of the cable insulation.

In the embodiment described the pre-formed parts are the only means of rendering the joint watertight at ocean depths, as well as providing electrical insulation up to 11,000 volts. The thickness of the pre-formed parts is not less than 10 mm throughout to achieve this.

We claim:

1. An underwater joint for coupling first and second submarine cables each said cable having optical transmission means, a metal strength member and an outer plastics insulating sheath, the joint comprising a pressure resistant tubular metal casing or sea case having reduced diameter end portions each adapted to receive a respective sheathed cable end, each said cable end being a sliding fit in the respective end portion, first and second clamp means whereby the strength member of each cable end is secured to the respective end portion of the housing member, means for splicing the optical transmission means of the first and second cables, and an outer plastics layer comprising two similar preformed plastics parts each fitted to a respective cable and extending over the metal casing, the plastics parts being secured to each other and to the plastics cable sheaths whereby to effect a watertight construction.

2. A joint as claimed in claim 1; wherein each said plastics housing part is sealed to its respective cable end by a ring-shaped moulded region which penetrates the cable insulation by an amount less than the thickness of the cable insulation.

3. A cable provided with one or more joints as claimed in claim 1.

* * * * *